US 11,504,619 B1
Nov. 22, 2022

(12) United States Patent
Borovikov et al.

(10) Patent No.: US 11,504,619 B1
(45) Date of Patent: Nov. 22, 2022

(54) INTERACTIVE REENACTMENT WITHIN A VIDEO GAME

(71) Applicant: Electronic Arts Inc., Redwood City, CA (US)

(72) Inventors: Igor Borovikov, Foster City, CA (US); Harold Henry Chaput, Castro Valley, CA (US); Nitish Victor, Redwood City, CA (US); Mohsen Sardari, Burlingame, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/410,245

(22) Filed: Aug. 24, 2021

(51) Int. Cl.
*A63F 13/497* (2014.01)

(52) U.S. Cl.
CPC .................................. *A63F 13/497* (2014.09)

(58) Field of Classification Search
CPC ........................................................ A63F 13/497
See application file for complete search history.

(56) References Cited

U.S. PATENT DOCUMENTS

| 6,650,338 | B1 * | 11/2003 | Kolarov | G06F 3/016 345/619 |
| 7,199,798 | B1 * | 4/2007 | Echigo | G06F 16/5854 345/473 |
| 8,665,307 | B2 * | 3/2014 | Setton | H04N 7/157 348/14.02 |
| 2003/0034996 | A1 * | 2/2003 | Li | G06F 16/7834 707/E17.028 |
| 2004/0062525 | A1 * | 4/2004 | Hasegawa | G11B 27/031 386/318 |
| 2007/0072681 | A1 * | 3/2007 | Zalewski | A63F 13/60 463/43 |
| 2007/0163427 | A1 * | 7/2007 | Rigopulos | G10H 1/0008 84/609 |
| 2008/0197573 | A1 * | 8/2008 | Palmer | A63F 1/04 273/298 |
| 2008/0211771 | A1 * | 9/2008 | Richardson | A63F 13/42 345/158 |

\* cited by examiner

*Primary Examiner* — Reginald A Renwick
(74) *Attorney, Agent, or Firm* — Lee & Hayes, P.C.

(57) ABSTRACT

A video reenactment system and method analyze a video clip that a video game player wishes to reenact and maps objects and actions within the video clip to virtual objects and virtual actions within the video game. A reenactment script indicating a sequence of virtual objects and virtual actions as mapped to objects and actions in the video clip is generated using a video translation model and stored for use in reenacting the video clip. The reenactment script can be used within the video game to reenact the objects and actions of the video clip. The reenactment of the video clip may be interactive, where a player may assume control within the reenactment and when the player relinquishes control, the reenactment will continue at an appropriate part of the sequence of actions by skipping actions corresponding to the ones played by the player.

20 Claims, 6 Drawing Sheets

INTERACTIVE REENACTMENT WITHIN A VIDEO GAME

BACKGROUND

Video games, including online hosted video games, allow a player of the game to perform actions with the video game. The player may control the actions of one or more objects, such as an avatar, within the video game. For example, a player may want to cook a pizza in a simulation video game or make a particular play in a hockey video game. In some cases, the player may want to replicate an action or sequence of actions that they may have seen on TV or other video clip. However, the player may not have the skills, or otherwise the ability, to replicate the action or sequence of actions that they want to reenact or have reenacted in the video game.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
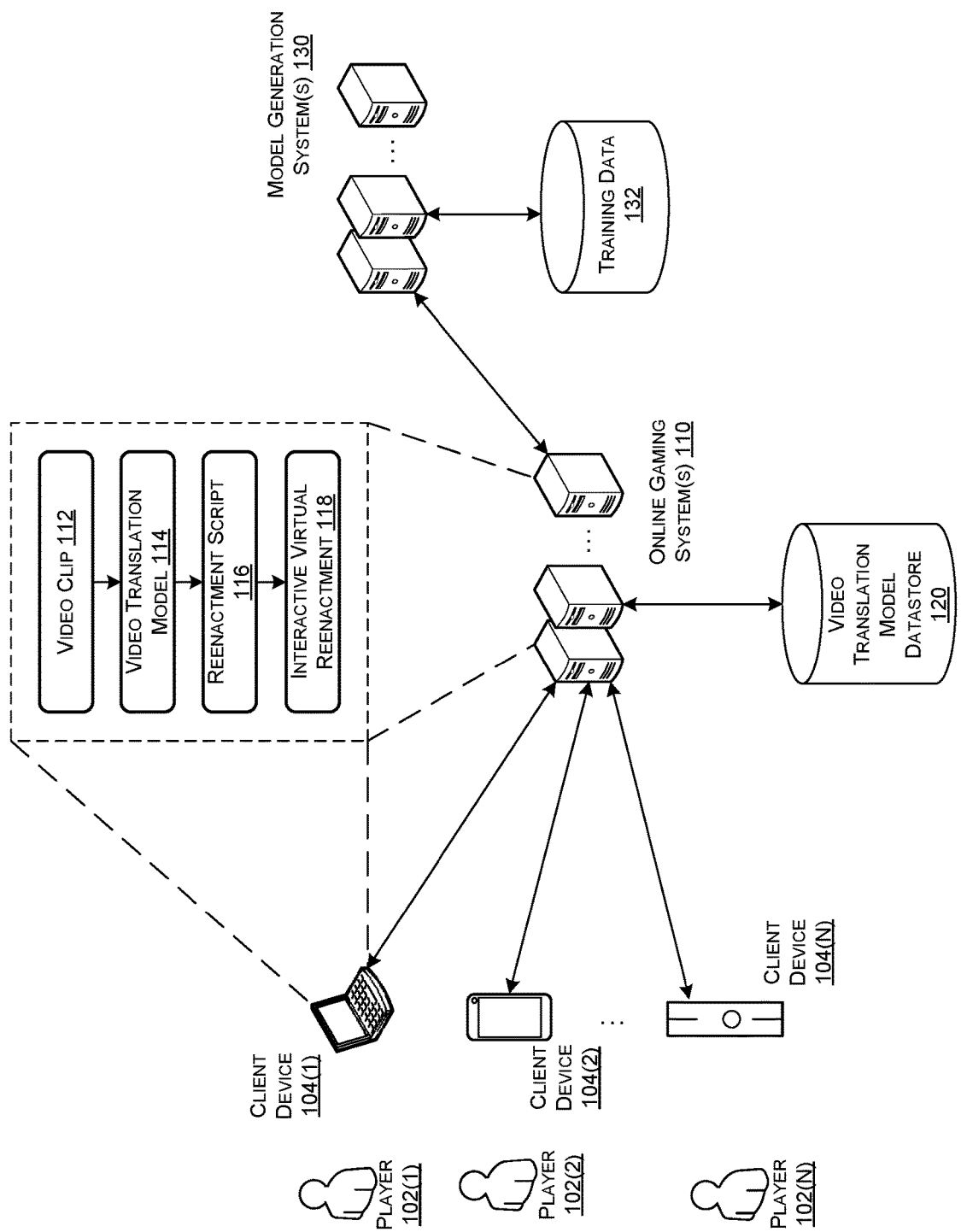
FIG. 1 illustrates a schematic diagram of an example environment with client system(s), online gaming system(s), and/or model generation system(s) to enable reenactment of video clips within a video game, in accordance with example embodiments of the disclosure.

Example embodiments of this disclosure describes methods, apparatuses, computer-readable media, and system(s) for reenacting video clips within a video game. The video clips may be from any suitable source, such as television, streaming media, video clips from social media, personally recorded video clips, etc. A player may provide the video clip to a system, such as the player's client device (e.g., video game machine, personal computer, etc.) and/or an online gaming system. The client device and/or online gaming system may then translate the video clip to a reenactment script using one or more video translation models. The reenactment script may then be used by the client device and/or the online gaming system to reenact the actions of the video clip. The reenactment may involve virtual objects (e.g., avatars, weapons, buildings, etc.) in the video game that are similar to the objects in the video clip performing virtual actions (e.g., movements, carrying other objects, explosions, etc.) within the video game that mimic the actions in the video clip. Thus, the mechanism for reenacting video clips in a video game, as disclosed herein, involves identifying objects in the video clip and mapping them to objects or assets in the video game, and further, mapping actions in the video clip to actions in the video game.

As a non-limiting example of reenactment of a video clip, a player may wish to reenact a sequence of actions from a basketball video clip within a basketball video game (e.g., NBA LIVE 19 by ELECTRONIC ARTS). In the basketball video clip, a first player may rebound a ball on the defensive end and make a long pass to another player at the offensive end who dunks the basketball. This basketball video clip may be from any suitable source, such as a television broadcast, a streaming video service, etc. The basketball video clip may be analyzed by the client device and/or online gaming system using a video translation model associated with this basketball video game. Using the video translation model, a first object (e.g., the first player in the basketball video clip) may be mapped to a first virtual object (e.g., a virtual first player) in the basketball video game. Similarly, the second player in the basketball video clip may be mapped to a second virtual player in the basketball video game. Other objects may also be identified, such as other players, the basketball, the coach on the sideline, etc. Additionally, the video translation models may be used by the client device and/or the online gaming system to isolate and identify, such as from across multiple frames of the basketball video clip, actions, such as the rebound, the pass, and the dunk. The objects and/or the actions may have various parameters associated with them, such as location of the players on the court, the velocity of the basketball, which way the various players are facing, etc. All of these objects, actions, and/or parameters may be logged into the reenactment script associated with this reenactment. Later on, the reenactment script may be used by the client device and/or the online gaming system to reenact the sequence of objects and actions within the basketball video clip.

As another non-limiting example of reenactment of a video clip, a player may wish to reenact a sequence of actions from a gardening video clip from a television show within a simulation video game (e.g., SIMS 4 by ELECTRONIC ARTS). In the gardening video clip, a person may replant a seedling into a larger pot. The person may first use a trowel to put a base layer of potting soil at the bottom of the pot from a potting soil bag, remove the seedling from its planter, place the seedling on the base layer of potting soil, use the trowel to place additional soil around the seedling, sprinkle some fertilizer around the seedling, and gently water the seedling in the new pot. The gardening video clip may be analyzed by the client device and/or online gaming system using a video translation model associated with this simulation video game. Using the video translation model, a first object (e.g., the person in the gardening video clip) may be mapped to a first virtual object (e.g., an avatar of the person) in the simulation video game. Similarly, other objects in the gardening video clip may be mapped to corresponding virtual objects in the simulation video game. For example, the seedling may be mapped to a virtual seedling, the potting soil may be mapped to virtual potting soil, the pot may be mapped to a virtual pot, and so on and so forth. The video translation models may be used by the client device and/or the online gaming system to isolate and identify, such as from across multiple frames of the gardening video clip, actions, such as picking up the trowel, picking up potting soil, removing the seedling from the planter, watering the transplanted seedling, etc. The objects and/or the actions may have various parameters associated with them, such as location of the seedling within the pot, the size of the pot, the volume of potting soil that can be picked up with the trowel, how much of the potting soil falls on the ground as it is being transported on the trowel to the pot, etc. All of these objects, actions, and/or parameters may be logged into the reenactment script associated with this reenactment. Later on, the reenactment script may be used by the client device and/or the online gaming system to reenact the sequence of objects and actions within the gardening video clip.

As described herein, the reenactment of a video clip may be interactive. Thus, a player may commence a sequence of actions of a reenactment and at some point within the reenactment may wish to take over in controlling the actions within the video game prior to the conclusion of all of the sequence of actions of the reenactment. For example, in the example above of the sequence of actions in the basketball video game reenactment, the player may wish to take control of the game after the first virtual basketball player passes the ball downcourt to the second virtual basketball player. Thus, the player may wish to control the actions of the second virtual basketball player. The player may want to change, for example, what the second virtual basketball player does. As a non-limiting example, the player may cause the second virtual basketball player to play a layup instead of a dunk, as was coded in the reenactment script. The player may interact with the video game within the reenactment by using one or more player inputs. The client system may receive player input, such as via a joystick, touchscreen, mouse, and/or any suitable user interface device. When the video game is hosted by an online gaming system, the client system may message the online gaming system indicating the one or more player inputs. According to examples of the disclosure, the player may be able to revert back to the reenactment if they so wish. The client system and/or online gaming system(s) may keep track of the actions that are to be skipped when the reenactment is resumed, so that the reenactment restarts at the appropriate action of the sequence of actions in the reenactment.

According to examples of the disclosure, the generation of the reenactment script from the video clip may be based on a video translation model. The video translation model allows objects in the video clip to be identified and/or objects in the video clip to be mapped to respective corresponding virtual objects in the video game. The video translation model may further enable detecting actions by one or more of the objects in the video clip and mapping the actions to virtual actions in the video game. The objects may be defined by one or more corresponding parameters. Indications of the sequence of mapped objects, actions, and/or any related parameters may be stored in a file as the reenactment script. This reenactment script may then be used by the video game operating on at least one of the client system and/or online gaming system(s) to reenact the sequence of objects and actions in the video clip.

The video translation models may be any suitable model, such as any variety of machine learning and/or artificial intelligence models. For example, the video translation models may include convolution neural network (CNN) models and/or other neural network models. The video translation models may include other models, such as decision tree models, gaussian tree models, Bernoulli models, random forest models, linear regression models, Bayesian network models, any variety of heuristics (e.g., genetic algorithms, swarm algorithms, etc.), combinations thereof, or the like. Outputs from the video translation models may provide indications of objects, actions, and/or parameters defining the aforementioned objects and/or actions in a video clip. The indications of objects, actions, and/or parameters defining the aforementioned objects and/or actions associated with a video clip may be stored in a file to generate a reenactment script. Therefore, the reenactment script may indicate a sequence of actions to be performed by one or more virtual objects within the video game. The reenactment script may be generated to include specific syntax that can later be read and performed within the video game, as operated on the client system and/or the online gaming system(s).

The video translation models may be trained using training data that may include any variety of labeled and/or unlabeled training data. In example embodiments, the labeled training data may include clips of video game play of the same video game for which the video translation model is to be trained. For example, video game clips for a simulation game (e.g., SIMS 4: PETS by ELECTRONIC ARTS), may be used to train a video translation model for the simulation game. Since the video game clips are from the same video game for which the video translation model is generated, the video game clips are already labeled. Labels, as used herein, refers to the objects and/or actions within a video clip (e.g., a video game clip) being identified. Thus, by using pre-labeled video game clips in training the video translation models, resources that would otherwise be used for labeling training video clips may be obviated. In other words, by using video game clips for training the video translation models, manual labeling of the video game clip is not needed, as the video game clips are already labeled with virtual objects available in the video game, as well as virtual actions that can be performed in the video game.

In some cases, other training video clips may be used for training the video translation model for a particular video game. These video clips may be obtained from any suitable location, such as a streaming service and/or social media. These video clips, in some cases, may be video game clips that people upload to one or more social media sites (e.g., YOUTUBE). Generally, these video game clips may not be labeled, meaning objects and/or actions may not be identified in these video game clips. In some cases, the unlabeled video game clips may be labeled, such as by a human and/or an automated mechanism. In other words, a human or an automated system (e.g., a bot) may identify and label objects and/or actions within the unlabeled video game clip. In some cases, the video game clips, when labeled may be used for training the video translation models. In yet other cases, video clips, including video game clips, television broadcast clips, social media video clips, etc. that are unlabeled may be used for training the video translation model.

According to examples of the disclosure, the training of the video translation models may use any suitable mechanism, such as unsupervised training, supervised training, and/or mixed (e.g., supervised and unsupervised) training. In some cases, labeled training video clips may be used in unsupervised training of a CNN model or other type of machine learning model. In other cases, unlabeled training video clips may be used for supervised training of a CNN model or other type of machine learning model. In yet other cases, both unlabeled and labeled training video clips may be used for any of supervised, unsupervised, and/or mixed training.

In example embodiments of the disclosure, a model generation system may generate and/or otherwise train the video translation models for a variety of video games.

Different video games may generally have separate video translation models, as the context of the game may be important in mapping objects and actions in a video clip to corresponding virtual objects and actions in the video game. Thus, a video translation model for a football video game may not be specifically tuned to robustly translate a hockey video clip to reenact a sequence in a hockey video game. Rather, game-specific video translation models may be used for more robust and accurate translation of in-context video clips for particular video games. However, as an alternative, the disclosure contemplates a unified video translation model that may be used across a variety of video games. Such a unified video translation model may, in some cases, identify a context of a video clip and then translate the video clip into a reenactment script in some cases.

The model generation system may be used to generate the video translation models for a variety of video games and then the video translation models may be deployed within the video games to be executed by the platform on which the video game is hosted, such as the client system and/or the online gaming system(s). In some examples, the video translation model may be updated by the model generation system for a particular video game. The video translation models may be updated, for example, to be more robust by training on additional training video clips, to incorporate new capabilities of the video game (e.g., new virtual objects and/or actions available in the video game), to correct for any recurring translation defects experienced in the field, or for any other suitable reasons. In some cases, updated video translation models may be made available to players, via their player accounts, by distributing those updated video translation models via any suitable mechanism, such as update packs and/or a software update via the Internet.

Although examples in the realm of video games and online gaming are discussed herein, it should be understood that the video reenactment mechanisms, as described herein, may be applied to any variety of virtual interactions. Indeed, without providing an exhaustive list of applications, the video translation models, as generated and deployed, may be applied to any suitable type of virtual and/or interactive experience, video editing, computer generated graphics/video, virtual and/or augmented reality, video calling, etc. For example, the technologies disclosed herein may be used for the purposes of reenacting a medical surgery video in a virtual setting and in an interactive manner to enable training surgeons in similar types of surgeries.

It should be understood that the systems and methods, as discussed herein, are technological improvements in the field of virtual reenactment and/or video gaming. For example, the methods and systems as disclosed herein enables computing resources to improve video and/or online gaming for players, via their player accounts, by enabling players to reenact real-world sequences of actions virtually within a video game. These improvements manifest in players experiencing improved enjoyment and improved engagement with video games. Indeed, the disclosure herein provides improvements in the functioning of computers to provide improvements in the technical field of video and online gaming and the reenactment of real-world actions in a virtual setting. Machine learning and artificial intelligence (AI)-based processes are disclosed that can provide translations from video clips to reenactment of the video clip in a virtual setting, such as a video game. This type of reenactment capability may not be possible with traditional mechanisms of human based game play of a particular video game. Furthermore, the mechanisms and systems discussed herein, provide interaction within a virtual environment, where a player can pause a reenactment and interact and/or deviate from the sequence of actions in the reenactment. Additionally, the technological problems addressed here are ones that arise in the computer-era and the Internet-era, such as in the fields of video and/or online gaming. Thus, not only is the disclosure directed to improvements in computing technology, but also to a variety of other technical fields related to video gaming, such as virtual reality, augmented reality, etc.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment with client system(s) 104, online gaming system(s) 110, and/or model generation system(s) 130 to enable reenactment of video clips within a video game, in accordance with example embodiments of the disclosure. The example environment 100 may include one or more player(s) 102(1), 102(2), . . . 102(N), hereinafter referred to individually or collectively as player 102 or player(s) 102, who may interact with respective client device(s) 104(1), 104(2), . . . 104(N), hereinafter referred to individually or collectively as client device 104 or client device(s) 104. The one or more player(s) 102 may interact with the one or more other elements of the environment 100 via corresponding respective player accounts.

The client devices 104 may be configured to render content associated with the video game and/or online game to respective players 102. This content may include video, audio, haptic, combinations thereof, or the like content components. In some cases, the client device(s) 104 may host the video game locally, where the respective player 102 interacts with his or her client device 104 locally to play the video game. In other cases, the video game may be hosted online by the online gaming system 110 and a player 102 may use his or her client device 104 to interact with the video game, as hosted on the online gaming system 110.

In the online gaming case, the client device(s) 104 may receive game state information from the one or more online gaming system(s) 110 that may host the online game played by the player(s) 102 of environment 100. The receiving of game state information and/or game parameters may be via one or more application program interfaces (APIs) of the online game being hosted by the online gaming systems 110. The client device(s) 104 may use the game state information to render current events (e.g., audio and video) of the online game as content. The game state information may be received by the client device(s) 104 repeatedly and/or continuously and/or as events of the online game transpire. The game state information may be based at least in part on the interactions that each of the player(s) 102 have via their client device(s) 104 responsive to events of the online game hosted by the game system(s) 110.

As events transpire in the online game, the game system(s) 110 may update game state information and send that game state information to the client device(s) 104. The client device(s) 104 may accept input from respective players 102 via respective input device(s) (e.g., joysticks, touchscreens, etc.) (not shown). For example, if the players 102 are playing an online soccer game, and the player 102 playing one of the goalies move in a particular direction, then that movement and/or goalie location may be represented in the game state information that may be sent, such as via the APIs, to each of the client device(s) 104 for rendering the event of the goalie moving in the particular direction. In this way, the content of the online game is repeatedly updated throughout game play. When the game client device(s) 104 receive the game state information from the game system(s) 110, the game client device(s) 104 may render updated content associated with the online game to its respective player 102. This updated content may embody events that may have transpired since the previous state of the game (e.g., the movement of the goalie).

The client device(s) 104 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 104 may execute programs thereon to host the video game and/or interact with the online gaming system(s) 110 to render game content based at least in part on game state information received from the online gaming system(s) 110. Additionally, the client device(s) 104 may receive indications of player input (e.g., player intended actions) and host the video game appropriately when played in a local fashion. When the video game is played online, the client device 104 may send indications of player inputs to the online gaming system(s) 110. Game state information and player input information and/or parameters may be shared between the game client device(s) 104 and the game system(s) 110 using APIs.

The game system(s) 110 may receive inputs (e.g., parameters representative of player inputs) from various players 102 via API calls to the APIs and update the state of the online game based thereon. As the state of the online game is updated, the state information and/or updates may be sent the various client system(s) 104 for rendering online game content to players 102. In this way, the game system(s) 110 host the online game.

According to the disclosure herein, the client device 104 and/or the online gaming system 110 may be configured to receive a video clip 112, such as from the player 102 who wishes to reenact the video clip 112. The video clip 112 may be from any suitable source, such as something that the player 102 recorded, from a television broadcast, from cable television, from a sports broadcast, from streaming media, from social media, or the like. The video clip 112 may include moving pictures, audio, or the like. The video clip may be in any suitable format (e.g., .mp3, .mp4, .avi, etc.).

The video clip 112 may next be applied to a video translation model 114 by either of the client device 104 and/or the online gaming system 110 to generate a reenactment script 116. In the case where the online gaming system 110 generates the reenactment script 116, the client device 104 may send the video clip 112, as provided by the player 102, to the online gaming system 110. The video translation model 114 allows objects in the video clip 112 to be identified and/or objects in the video clip 112 to be mapped to respective corresponding virtual objects in the video game. The video translation model 114 may further enable detecting actions by one or more of the objects in the video clip and mapping the actions to virtual actions in the video game. The objects may be defined by identifiers and/or one or more corresponding parameters. Indications of the sequence of mapped virtual objects, virtual actions, and/or any related parameters may be stored in a file as the reenactment script 116. This reenactment script 116 may then be used by the video game operating on at least one of the client system 104 and/or online gaming system 110 to reenact the sequence of objects and actions in the video clip 112.

The reenactment script 116 may be stored locally at the client device 104 or in the cloud, such as at the online gaming system 110, for use when the player 102 wishes to reenact the sequence of objects and events of the video clip 112. In some cases, the reenactment script 116 may be shared by one player 102 with other players 102 (e.g., the sharing player's friends) who may also wish to reenact the video clip 112. The reenactment script 116 may also be shared across a wide variety of people. For example, a player may wish to upload the reenactment script 116 to a file sharing site, a reenactment script library, a social media site to share with other players 102 of the video game. For example, a father may record a particularly good play that his daughter performed in hockey and generate a reenactment script 116 of that play associated with a hockey video game (e.g., NHL 19 by ELECTRONIC ARTS). The father may wish to post the reenactment script 116 for replicating his daughter's play on social media, so that friends and family can download the reenactment script 116 and virtually reenact the play when they play the video game.

The reenactment script 116 may be used by the client device 104 and/or the online gaming system 110 to enable an interactive virtual reenactment 118 of the objects and actions in the video clip 112. Therefore, in some cases a player 102 may choose to perform the reenactment in its entirety, while another player 102 may choose to perform the reenactment interactively where they change one or more virtual objects and/or virtual actions within the reenactment. In other words, a player 102 may choose to commence a sequence of actions of a reenactment and at some point within the reenactment may wish to take over in controlling the actions within the video game prior to the conclusion of all of the sequence of actions of the reenactment.

A non-limiting example of player 102 interaction within a reenactment of a video clip may be illustrated by a non-limiting example of a simulation video game. A player 102 may generate a reenactment script 116 from a video clip for making a pizza. The reenactment script 116 may indicate a particular avatar preheating an oven to 350° F., rolling virtual dough on a pizza tray, spreading pizza sauce over an upper surface of dough, spreading grated cheese over the pizza sauce, placing pepperoni slices on the grated cheese, placing the pizza on the pizza tray in the pre-heated oven, and letting the pizza bake for 20 minutes. In some cases, the player 102 may choose to run this reenactment in its entirety. However, in other cases, the player 102 may choose to make modifications to this reenactment. For example, the player 102 may take over control from the reenactment after the spreading the grated cheese, because the player 102 may wish to use different toppings on the pizza. The client device 104 and/or the online gaming system 110 may recognize that the player 102 wishes to assume control within the ongoing reenactment based at least in part on any suitable input from the player 102. For example, if the player 102 moves his or her input device (e.g., joystick) the client device 104 and/or the online gaming system 110 may recognize that the player 102 wishes to assume control away from the automated ongoing reenactment. In other cases, the player 102 may provide an input (e.g., pressing the "Esc" key) to pause the reenactment, at which point the player 102 may be able to control the avatar making the pizza.

Continuing with the non-limiting example of making the pizza, the player 102 may place mushrooms over the grated cheese instead of the pepperoni, as coded in the reenactment script 116. The video game as operating on the client device 104 and/or online gaming system 110 may recognize that placing the mushrooms correspond to the reenactment step of placing pepperoni on the pizza. If the player 102 wishes to return control of the video game back to the reenactment script, the reenactment may skip the placement of pepperoni on the pizza and perform the next action in the sequence of placing the pizza in the pre-heated oven. Thus, the video game, as operating on the client device 104 and/or online gaming system 110 is configured to keep track of actions that are to be skipped when a player 102 assumes control within an ongoing reenactment and then control is returned back to the reenactment. In some cases, the video game, as operating on the client device 104 and/or the online gaming system 110, may recognize more than one action during an interactive portion, when the player 102 is in control of the action, that corresponds to a single action in the reenactment script 116. For example, had the player 102 put mushrooms on the pizza and then further pulled olives from the refrigerator and put olives on the pizza before returning control to the reenactment, the video game would recognize that only the action of putting pepperoni on the pizza is to be skipped when the reenactment resumes.

It should be appreciated that the disclosure herein contemplates various levels of exactness in the reenactment within the video game of the video clip 112. For examples, virtual objects and/or virtual actions may exactly match corresponding objects and/or actions in the video clip 112, or alternatively, be similar to the objects and/or actions in the video clip 112. In some cases, the virtual objects and/or virtual actions may match their corresponding objects and actions in the video clip 112 within a threshold level. This matching process may not always perfectly replicate the objects and actions in the video clip, as assets (e.g., virtual objects and/or virtual actions) in the video game may not perfectly match objects and actions in the video clip 112. Thus, this process may entail matching objects and actions in the video clip 112 to the best available virtual objects and virtual actions available in an inventory of virtual objects and virtual actions of the video game. In some cases, a particular object in the video clip 112 may be mapped to a particular virtual object in the video game by determining that no other virtual object in the inventory of virtual objects in the video game match with the particular object better than the particular virtual object. Similarly, a particular action in the video clip 112 may be mapped to a particular virtual action in the video game by determining that no other virtual action in the inventory of virtual actions in the video game match with the particular action better than the particular virtual action.

In some cases, the online gaming system(s) 110 may host a variety of games for a variety of online players 102. In this case, the online gaming system(s) 110 may have access to a video translation model datastore 120 where a variety of video translation models 118 may be stored for a variety of video games. The online gaming system(s) 110 may access a corresponding video translation model 114 for a game that it is hosting from the video translation model datastore 120. In some examples, the online gaming system(s) 110 may be configured to provide to the client device(s) 104 new and/or updated video translation models 114 from the video translation model datastore 120.

The environment 100 may further include one or more model generation system(s) 130 that are configured to generate and/or update video translation models 114. In some cases, the model generation system(s) 130 may generate various video translation models 114 corresponding to various respective video games. The model generation system(s) 130 may train the video translation model 114 using any variety of training data 132, such as labeled and/or unlabeled training videos. The model generation system(s) 130 may also update video translation models 114, such as when new training data 132 is available, when issues with a particular video translation model 114 is identified, when new capabilities (e.g., new virtual objects and/or virtual actions) are added to the associated video games, etc. The model generation system(s) 130, in some cases, may further be configured to receive and/or scrape training data 132, such as training video clips, from a variety of sources, such as social media and/or streaming services. The model generation system(s) 130 may still further be configured to provide new and/or updated video translation models 114 to the online gaming system(s) 110 and/or the client device(s) 104.

The video translation models 114 may be any suitable model, such as any variety of machine learning and/or artificial intelligence models. For example, the video translation models may include convolution neural network (CNN) models and/or other neural network models. The video translation models 114 may include other models, such as decision tree models, gaussian tree models, Bernoulli models, random forest models, linear regression models, Bayesian network models, any variety of heuristics (e.g., genetic algorithms, swarm algorithms, etc.), combinations thereof, or the like. Outputs from the video translation models 114 may provide indications of objects, actions, and/or parameters defining the aforementioned objects and/or actions in a video clip.

The indications of objects, actions, and/or parameters defining the aforementioned objects and/or actions associated with a video clip may be stored in a file to generate the reenactment script 116. Therefore, the reenactment script 116 may indicate a sequence of virtual actions to be performed by one or more virtual objects within the video game. The virtual actions, as determined via the video translation model 114, may encompass any suitable level of abstraction and/or suitable level of detail. For example, definitions and/or parameters may encompass explicit coordinates in the virtual space (e.g., video game space). Alternatively actions and/or outcomes may be defined and/or indicated by movements relative to other virtual objects with any suitable level of abstraction. For example, an action in a simulation video game may indicate a relatively more exact action definition, such as "place the silver spatula to the right of the burger on the grill side table" or a relatively more abstract definition, such as "make a spatula available while grilling." Thus, it should be appreciated that the definition of objects and/or actions may have any variety of definiteness and/or abstraction within a video game or between different video games. A similar type of abstraction may be implemented within video games with respect to outcomes of actions. As a non-limiting example, different levels of abstraction may include (from more definite to more abstract) as follows: pizza came out of oven golden brown with pepperoni and mushroom toppings; pizza slightly overcooked; pizza baking successful; and pizza burned.

The reenactment script 116 may be generated to include specific syntax that can later be read and performed within the video game, as operated on the client system and/or the online gaming system(s). The reenactment script 116, in some cases, may include a list of actions. In other cases, the reenactment script 116 may include a recurrent neural network, behavior tree, or any other suitable mechanism for controlling the video game and agents and/or assets therein. In other words, the reenactment script 116 is not necessarily a fixed type of representation of the video game control loop, but rather any type of mechanism that can control the video game according to the corresponding reenactment.

Figure 2:
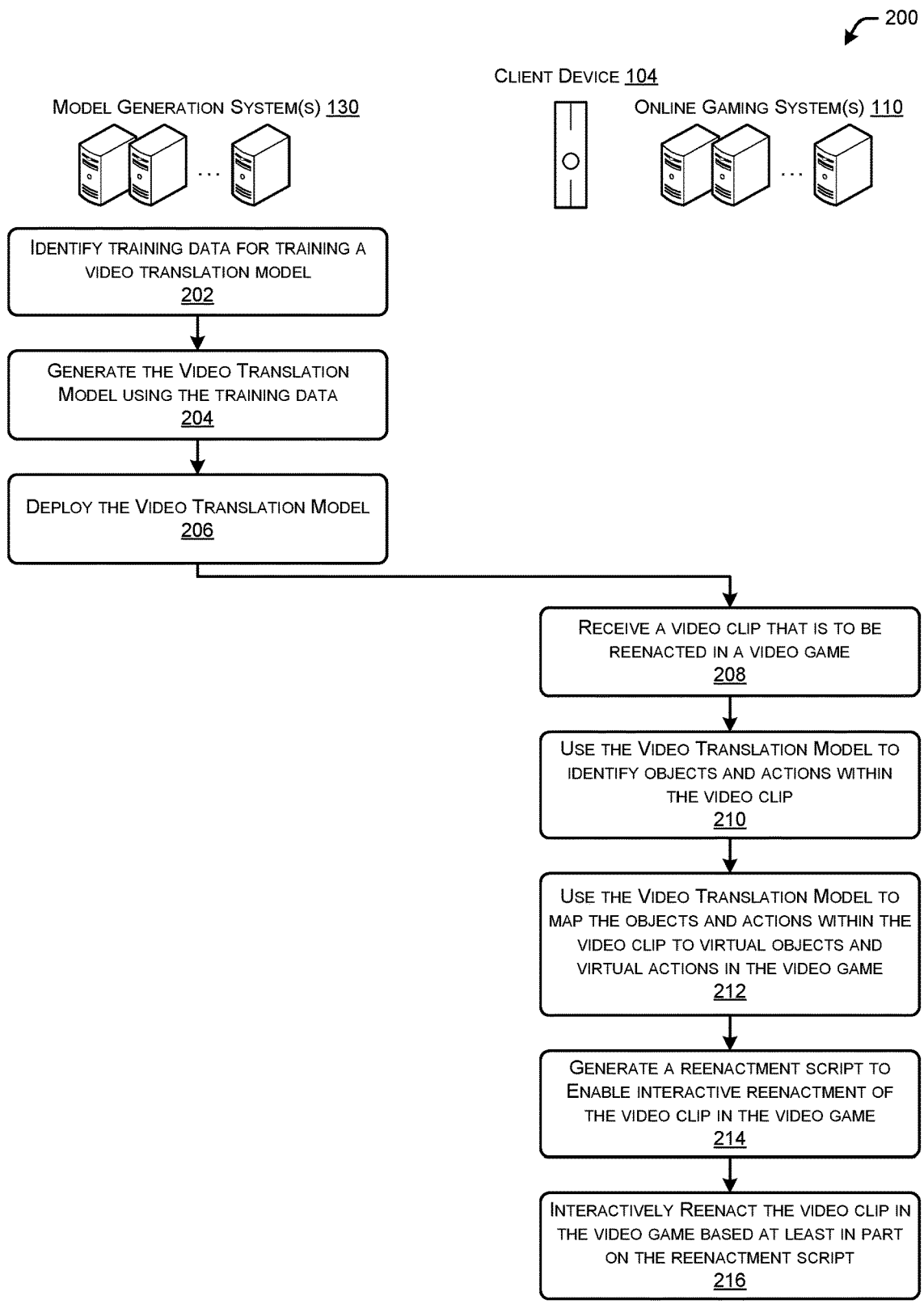
FIG. 2 illustrates a flow diagram of an example method by which a video clip is reenacted in a video game, in accordance with example embodiments of the disclosure.

FIG. 2 illustrates a flow diagram of an example method 200 by which a video clip 112 is reenacted in a video game, in accordance with example embodiments of the disclosure. Method 200 may be performed by a combination of the model generations system(s) 130 and either the client device 104 or the online gaming system(s) 110, individually or in cooperation with other elements of environment 100.

At block 202, the model generating system 130 may identify training data for training a video translation model 114. As discussed herein, the training data 132 may include any suitable training data, such as labeled video clips, unlabeled video clips, or a combination of the aforementioned. In some cases, the training data may be video game clips that are already labeled due to the video game clips being generated by the video game itself. Thus, using video game clips as training data allows for a low-resource mechanism for obtaining labeled training data that can then be used for training video translation models 114. In other words, the video game clips, by virtue of being generated by the video game, are already labeled, and therefore, are high-quality training data 132 for training the video translation models on mapping objects and actions in video clips to virtual objects and virtual actions in the video game. The training data 132 may, in some cases, further include other labeled data, such as video clips that are partially or fully labeled by humans or by bots, and/or unlabeled data, such as video clips where objects and/or actions are not identified and/or labeled.

At block 204, the model generation system 130 may generate the video translation model using the training data. The video translation models 114 may be any suitable model, such as any variety of machine learning and/or artificial intelligence models. For example, the video translation models may include convolution neural network (CNN) models and/or other neural network models. The video translation models 114 may include other models, such as decision tree models, gaussian tree models, Bernoulli models, random forest models, linear regression models, Bayesian network models, any variety of heuristics (e.g., genetic algorithms, swarm algorithms, etc.), combinations thereof, or the like. The training process may involve any suitable process, such as video segmentation, to analyze the training data 132, such as labeled video clips and/or unlabeled video clips. For example, spatial segmentation techniques may be used to identify objects within the training video lips, such as video game clips. Additionally, temporal or across frame segmentation may be used to identify movement and/or actions of objects identified in the training video clips. A variety of image processing and/or video processing techniques may be used to identify objects and/or actions within the training data 132 video clips, such as edge detection, motion detection, etc. Any combination of unsupervised, supervised, or bother unsupervised and supervised training may be used to generate the video translation model 114.

At block 206, the model generation system 130 may deploy the video translation model 114. Deployment may involve providing the video translation model 114 to the client device 104 and/or the online gaming system 110 where the video translation models may be used to reenact video clips 112. In some cases, the deployment of the video translation model 114 may involve including the video translation model 114 in media sold to players 102 when players purchase a video game at a store. Alternatively, the deployment of the video translation model 114 may involve sending the video translation model 114 to the client device 104 and/or the online gaming system 110, such as via the Internet. In the case where the video game is hosted by the online gaming system 110 and where the online gaming system 110 generates the reenactment script 116, the video translation model 114 may be provided by the model generation system 130 to the online gaming system 110.

At block 208, client device 104 and/or the online gaming system 110 may receive a video clip 112 that is to be reenacted in a video game. At this point, the client device 104 and/or the online gaming system 110 may already have the video translation model 114. The video clip 112 may be received by any suitable mechanism, such as the player 102 providing the video clip 112 to the client device 104 and/or the online gaming system 110.

At block 210, the client device 104 and/or the online gaming system 110 may use the video translation model 114 to identify objects and actions within the video clip. This process may involve video segmentation, such as spatial segmentation within frames of the video clip 112 and/or temporal segmentation across frames of the video clip 112. In this process, the client device 104 and/or the online gaming system 110 may identify objects and actions in the video clip 112 that it is to map to assets (e.g., virtual objects and virtual actions) within the video game.

At block 212, the client device 104 and/or the online gaming system 110 may use the video translation model 114 to map the objects and actions within the video clip 112 to virtual objects and virtual actions within the video game. This process may occur simultaneously with the processes of block 210, as described above, in some cases. Objects and actions identified in the video clip 112 may be mapped to virtual objects and virtual actions, respectively. This matching process may not always perfectly replicate the objects and actions in the video clip, as assets (e.g., virtual objects and/or virtual actions) in the video game may not perfectly match objects and actions in the video clip 112. Thus, this process may entail matching objects and actions in the video clip 112 to the best available virtual objects and virtual actions available in an inventory of virtual objects and virtual actions of the video game. In some cases, a particular object in the video clip 112 may be mapped to a particular virtual object in the video game by determining that no other virtual object in the inventory of virtual objects in the video game match with the particular object better than the particular virtual object. Similarly, a particular action in the video clip 112 may be mapped to a particular virtual action in the video game by determining that no other virtual action in the inventory of virtual actions in the video game match with the particular action better than the particular virtual action. It should be appreciated that the disclosure herein contemplates various levels of exactness in the reenactment within the video game of the video clip 112. For examples, virtual objects and/or virtual actions may exactly match corresponding objects and/or actions in the video clip 112, or alternatively, be similar to the objects and/or actions in the video clip 112. In some cases, the virtual objects and/or virtual actions may match their corresponding objects and actions in the video clip 112 within a threshold level.

At block 214, the client device 104 and/or the online gaming system 110 may generate a reenactment script 116 to enable interactive reenactment of the video clip in the video game. The reenactment script 116 may indicate the sequence of virtual objects and virtual actions that are to be rendered (e.g., video, audio, haptic, etc.) to reenact the video clip 112. Thus, the reenactment script 116 can be stored and used later on to reenact the video clip 112. The reenactment script 116 may include particular syntax that can be used and understood by a video game engine of the video game to reenact the video clip 112. The reenactment script 116, in some cases, may include a list of actions. In other cases, the reenactment script 116 may include a recurrent neural network, behavior tree, or any other suitable mechanism for controlling the video game and agents and/or assets therein. In other words, the reenactment script 116 is not necessarily a fixe type of representation of the video game control loop, but rather any type of mechanism that can control the video game according to the corresponding reenactment.

At block 216, the client device 104 and/or the online gaming system 110 may interactively reenact the video clip in the video game based at least in part on the reenactment script 116. The player 102 may choose to reenact the video clip 112 using the reenactment script 116 and indicate the same to the client device 104 and/or the online gaming system 110 by any suitable mechanism, such as by the player 102 pausing video game play and selecting an indicia (e.g., an icon) associated with the reenactment script 116 and/or the video clip 112 using an input device (e.g., joystick, keyboard, mouse, etc.).

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 3:
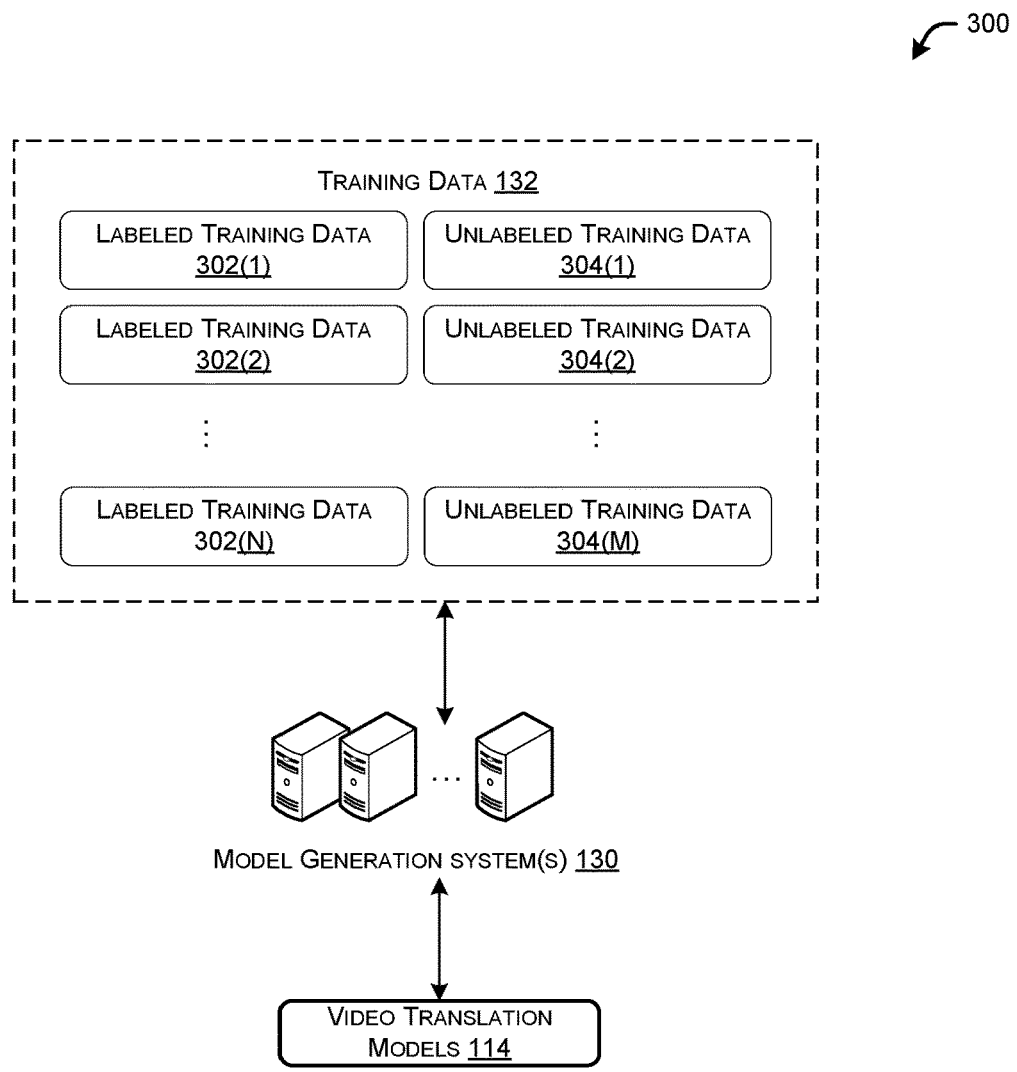
FIG. 3 illustrates an example environment where the model generation system(s) of FIG. 1 uses training data to generate video translation models, in accordance with example embodiments of the disclosure.

FIG. 3 illustrates an example environment 300 where the model generation system(s) 130 of FIG. 1 uses training data 132 to generate video translation models 114, in accordance with example embodiments of the disclosure. It should be noted that in some cases, the model generation system(s) 130 may be distributed systems and/or part of other systems, such as part of the online gaming system 110.

To generate video translation models 114, the various models may be trained using the training data 132 as received by and/or generated by the model generation system(s) 130. The training data 132 may include one or more labeled training data 302(1), 302(2), . . . , 302(N), hereinafter referred to, individually or in plurality, as labeled training data 302. The training data 132 may further include unlabeled training data 304(1), 304(2), . . . , 304(M), hereinafter referred to, individually or in plurality, as unlabeled training data 304.

The training data 132 may be gathered in any suitable manner. In example embodiments, the labeled training data 302 may include clips of video game play of the same video game for which the video translation model 114 is to be trained. Since, in this case, the video game clips are from the same video game for which the video translation model 114 is generated, the video game clips are already labeled with the assets (e.g., virtual objects and/or virtual actions) of the video game. Thus, by using pre-labeled video game clips as labeled training data 302 in training the video translation model 114, resources that would otherwise be used for labeling training video clips may not be needed. For example, manual labeling of the video game clips may not be needed, as the video game clips are already labeled with virtual objects available in the video game, as well as virtual actions that can be performed in the video game.

In some cases, other training video clips may be used as unlabeled data 304 for training the video translation model 114 for a particular video game. These video clips may be obtained from any suitable location, such as a streaming service and/or social media. These video clips, in some cases, may be video game clips that people upload to one or more social media sites. Generally, these video game clips may not be labeled, meaning objects and/or actions may not be identified in these video game clips. In some cases, the unlabeled video game clips may be labeled, such as by a human and/or an automated mechanism. In other words, a human or an automated system (e.g., a bot) may identify and label objects and/or actions within the unlabeled training data 304. In some cases, the video game clips, when labeled may be used for training the video translation model 114. In other cases, video clips, including video game clips, television broadcast clips, social media video clips, etc. that are unlabeled may be used for training the video translation model 114. In yet other cases, both labeled training data 302 and unlabeled training data 304 may be used to train the video translation model 114.

The video translation models 114 may be any suitable model, such as any variety of machine learning and/or artificial intelligence models. For example, video translation models 114 may include a CNN model, other types of neural network model, decision tree model, a gaussian tree model, a Bernoulli model, and a random forest model, linear regression models, Bayesian network models, any variety of heuristics (e.g., genetic algorithms, swarm algorithms, etc.), combinations thereof, or the like.

These model generation system(s) 130 may be configured to train the video translation models 114, as described herein. This training may be supervised, unsupervised, or partially supervised (e.g., semi-supervised). This training may include fitting the outcome labeled training data 302 of the training data 132 to virtual objects and/or virtual actions, as labeled within the labeled training data 302. In example embodiments, the bot detection systems 140 may wait to train the video translation models 114 until a sufficient amount of the training data 132 is available. It should be appreciated that more accurate and robust video translation models 114 may be generated by using a larger corpus of training data 132.

In some cases, once the video translation models 114 are generated using the training data 132, the video translation models 114 may be tested. This testing, in some cases, may be performed on a portion of the training data 132 or other training data 132 that had not been used to train the video translation models 114. The performance of the video translation model 114 in correctly mapping objects and actions to virtual objects and virtual actions in the video game may be assessed prior to deploying the video translation model 114. In some cases, testing metrics of the performance of trained video translation models 114 may not be equally considered when determining the overall performance of the video translation models 114. For example, the false object matches (e.g., incorrectly matching an object in the video clip 112 to a virtual object) may be weighted less than false action matches (e.g., incorrectly matching an action in the video clip 112 to a virtual action), or vice-versa.

In some cases, the video translation model may be a combination of more than one machine learning model. As a non-limiting example, there may be four models used for generating the reenactment script 116: a CNN, a decision tree model, a Bernoulli model, and a random forest model.

These models may be generated by training each of these models using training data 132. The models may then be tested against additional training data 132 to determine their performance. It may be found that the CNN model performs the best, followed by the decision tree model, then the Bernoulli model, and finally the random forest model. In this case, the output of the CNN model may be weighted at 50%, the decision tree model at 25%, the Bernoulli model at 15%, and the gaussian tree model at 10%. This is an example weighting, and in some cases the weights selected for the video translation models 114 may be proportional to their relative performance in object and action mapping, false negatives, and/or false positives.

Figure 4:
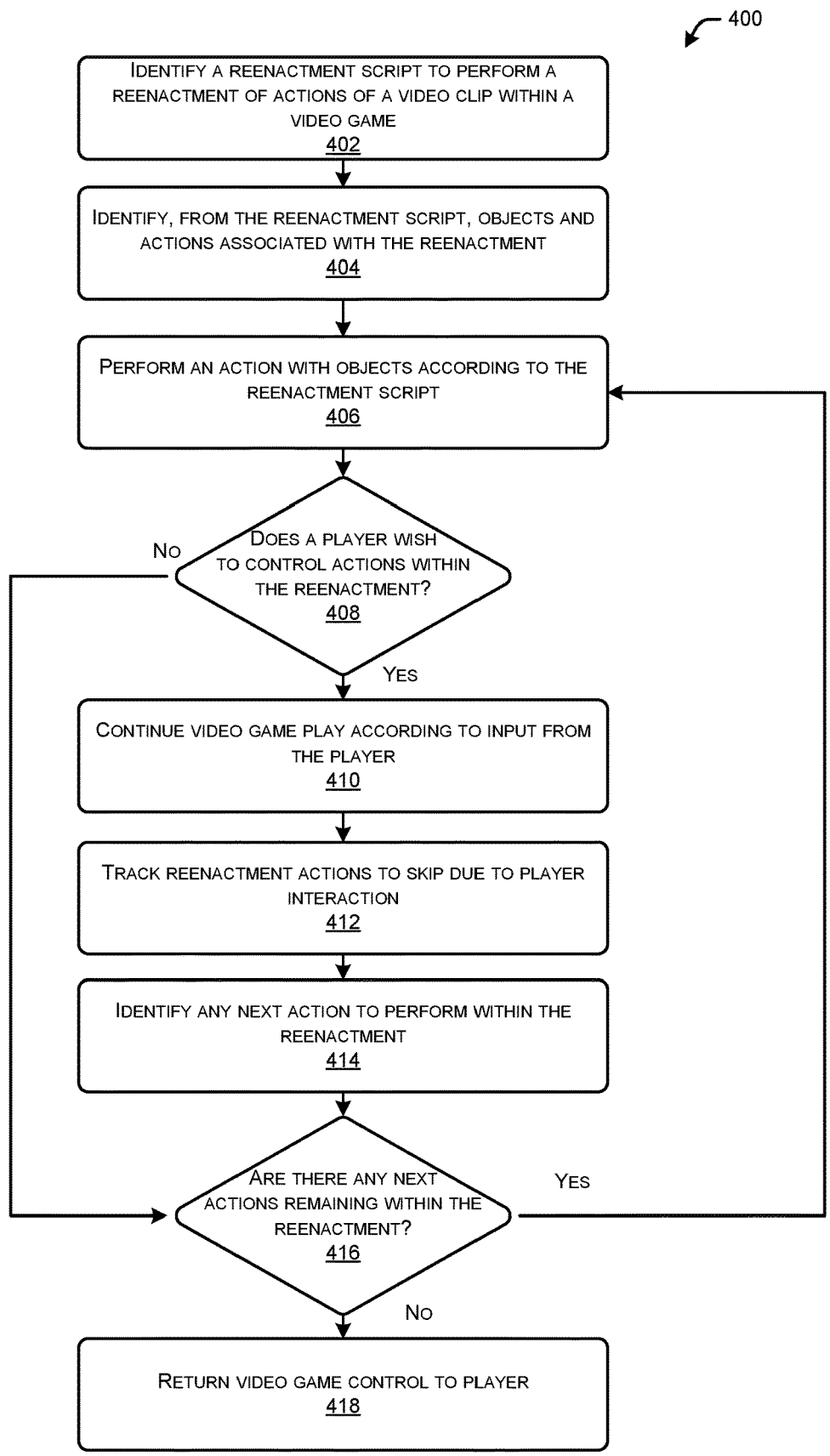
FIG. 4 illustrates a flow diagram of an example method for interactively reenacting a video clip in a video game, in accordance with example embodiments of the disclosure.

FIG. 4 illustrates a flow diagram of an example method 400 for interactively reenacting a video clip in a video game, in accordance with example embodiments of the disclosure. The method 400 may be performed by the client devices 104 and/or the online gaming system(s) 110, individually or in cooperation with one or more other elements of the environment 100. The method 400 may be an example process for the operations of block 216 of method 200 of FIG. 2.

At block 402, the client device 104 and/or the online gaming system(s) 110 may identify a reenactment script 116 to perform a reenactment of actions of a video clip 112 within a video game. The player 102 may indicate, via player input to the client device 104, which reenactment script 116 they wish to reenact.

At block 404, the client device 104 and/or the online gaming system(s) 110 may identify, from the reenactment script 116, objects and actions associated with the reenactment. These virtual objects and actions may be in a sequence. In some cases, the reenactment script 116 may also include timing information for the virtual actions that are to be performed according to the reenactment script 116.

At block 406, the client device 104 and/or the online gaming system(s) 110 may perform an action with objects according to the reenactment script 116. The client device 104 and/or the online gaming systems 110 may commence performing the sequence of virtual actions in order, such as starting from the first virtual action.

At block 408, the client device 104 and/or the online gaming system(s) 110 may determine whether a player 102 wishes to control actions of within the reenactment. This determination may be based at least in part on the player 102 providing an input indicating that they wish to take control of the video game part way through the reenactment of the video clip 112. If it is determined that the player does not wish to control actions within the reenactment, then the method 400 may advance to block 416, where the client device 104 and/or the online gaming system(s) 110 may determine whether there are any further actions remaining within the reenactment. If it is determined that there is a next action remaining in the reenactment, then the method 400 may return to block 406 to automatically perform the next action in the reenactment. If, however, at block 416 it is determined that there are no additional actions remaining in the reenactment, then at block 418, the client device 104 and/or the online gaming system(s) 110 may return control of the video game back to the player 102.

If, at block 408, it is determined that the player 102 does wish to control the actions within the reenactment, then, at block 410, the client device 104 and/or the online gaming system(s) 110 may continue video game play according to input from the player 102. At this point, it should be understood that portions of the reenactment may have already transpired. Thus, the reenactment may be paused at the point where it is detected that the player 102 wishes to control at least some aspects of the reenactment.

At block 412, the client device 104 and/or the online gaming system(s) 110 may track reenactment actions to skip due to player interaction. In some cases, the video game, as operating on the client device 104 and/or the online gaming system(s) 110, may assess, based on similarity and/or continuity of the next actions, which action(s) in the reenactment script 116 correspond to actions performed by the player 102 in the video game. During manual operation, the player may insert additional virtual actions, remove virtual actions, and/or substitute virtual actions relative to what is indicated in the reenactment script 116.

At block 414, the client device 104 and/or the online gaming system(s) 110 may identify any next action to perform within the reenactment. This next action in the reenactment may skip any corresponding actions from the reenactment that were performed by the player 102 by way of his or her interaction and control of at least one object within the video game and during the reenactment.

Figure 5:
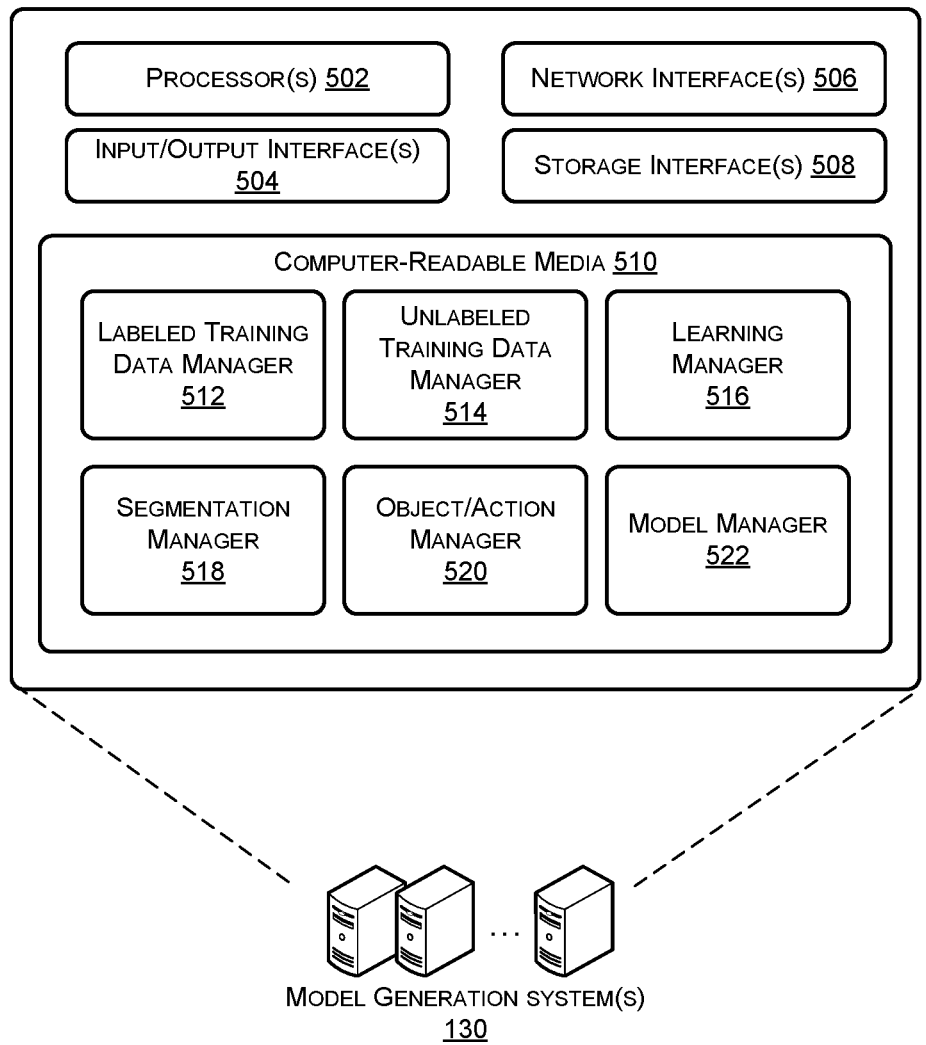
FIG. 5 illustrates a block diagram of example model generation system(s) that may generate video translation models, in accordance with example embodiments of the disclosure.

FIG. 5 illustrates a block diagram of example model generation system(s) 130 that may generate video translation models, in accordance with example embodiments of the disclosure. The model generation system(s) 130 may include one or more processor(s) 502, one or more input/output (I/O) interface(s) 504, one or more network interface(s) 506, one or more storage interface(s) 508, and computer-readable media 510.

In some implementations, the processors(s) 502 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 502 may possess its own local memory, which also may store program modules, program data, and/or one or more operating system(s). The one or more processor(s) 502 may include one or more cores.

The one or more input/output (I/O) interface(s) 504 may enable the model generation system(s) 130 to detect interaction with a user and/or other system(s), such as one or more game system(s) 110. The I/O interface(s) 504 may include a combination of hardware, software, and/or firmware and may include software drivers for enabling the operation of any variety of I/O device(s) integrated on the model generation system(s) 130 or with which the model generation system(s) 130 interacts, such as displays, microphones, speakers, cameras, switches, and any other variety of sensors, or the like.

The network interface(s) 506 may enable the model generation system(s) 130 to communicate via the one or more network(s). The network interface(s) 506 may include a combination of hardware, software, and/or firmware and may include software drivers for enabling any variety of protocol-based communications, and any variety of wireline and/or wireless ports/antennas. For example, the network interface(s) 506 may comprise one or more of a cellular radio, a wireless (e.g., IEEE 802.1x-based) interface, a Bluetooth® interface, and the like. In some embodiments, the network interface(s) 506 may include radio frequency (RF) circuitry that allows the model generation system(s) 130 to transition between various standards. The network interface(s) 506 may further enable the model generation system(s) 130 to communicate over circuit-switch domains and/or packet-switch domains.

The storage interface(s) 508 may enable the processor(s) 502 to interface and exchange data with the computer-readable medium 510, as well as any storage device(s) external to the model generation system(s) 130, such as any datastore storing training data 132.

The computer-readable media 510 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 510 may be implemented as computer-readable storage media (CRSM), which may be any available physical media accessible by the processor(s) 502 to execute instructions stored on the memory 510. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 502. The computer-readable media 510 may have an operating system (OS) and/or a variety of suitable applications stored thereon. The OS, when executed by the processor(s) 502 may enable management of hardware and/or software resources of the model generation system(s) 130.

Several functional blocks having instruction, data stores, and so forth may be stored within the computer-readable media 510 and configured to execute on the processor(s) 502. The computer readable media 510 may have stored thereon a labeled training data manager 512, an unlabeled training data manager 514, a learning manager 516, a segmentation manager 518, an object/action manager 520, and a model manager 522. It will be appreciated that each of the functional blocks 512, 514, 516, 518, 520, 522, may have instructions stored thereon that when executed by the processor(s) 502 may enable various functions pertaining to the operations of the model generation system(s) 130.

The instructions stored in the labeled training data manager 512, when executed by the processor(s) 502, may configure the model generation system(s) 130 to receive and/or store labeled training data 302, such as video game clips that are prelabeled. The processor(s) 502 may organize, store, and/or queue the labeled training data 302 when needed for training the video translation models 114.

The instructions stored in the unlabeled training data manager 514, when executed by the processor(s) 502, may configure the model generation system(s) 130 to receive and/or store unlabeled training data 304, such as training video clips that are harvested from social media sites and/or streaming sites. The processor(s) 502 may organize, store, and/or queue the unlabeled training data 302 when needed for training the video translation models 114. In some cases, the processor(s) 502 may facilitate labeling of unlabeled training data 304, such as by a human and/or a bot.

The instructions stored in the learning manager 516, when executed by the processor(s) 502, may configure the model generation system(s) 130 to train the video translation model 114 using labeled training data 302 and/or unlabeled training data 304. As discussed herein, the video translation model 114 may include a CNN, other neural network models, or any other suitable machine learning model. In some cases, the video translation model 114 may include a combination of different machine learning models. In these cases, the processor(s) 502 may train a number of different machine learning models and combine them to generate the video translation model 114.

The instructions stored in the segmentation manager 518, when executed by the processor(s) 502, may configure the model generation system(s) 130 to perform any suitable type of video segmentation, such as within frame segmentation, frame-to-frame segmentation, spatial/areal segmentation, and/or temporal segmentation to identify objects and actions in training data 132. This segmentation analysis may be performed prior to mapping objects and/or actions in the training data 132 to virtual objects and/or virtual actions in the video game.

The instructions stored in the object/action manager 520, when executed by the processor(s) 502, may configure the model generation system(s) 130 to map objects and/or actions in the training data 132 to virtual objects and/or virtual actions in the video game. This matching process may provide training for the video translation model 114 to map elements of a video clip to assets in the video game.

The instructions stored in the model manager 522, when executed by the processor(s) 502, may configure the model generation system(s) 130 to generate the video translation models 114 for a variety of video games and deploy those models to other suitable entities, such as the client device 104 and/or online gaming system(s) 110. In some cases, the processor(s) 502 update video translation models 114 and manage their storage, versions, and/or updates/deployment.

Figure 6:
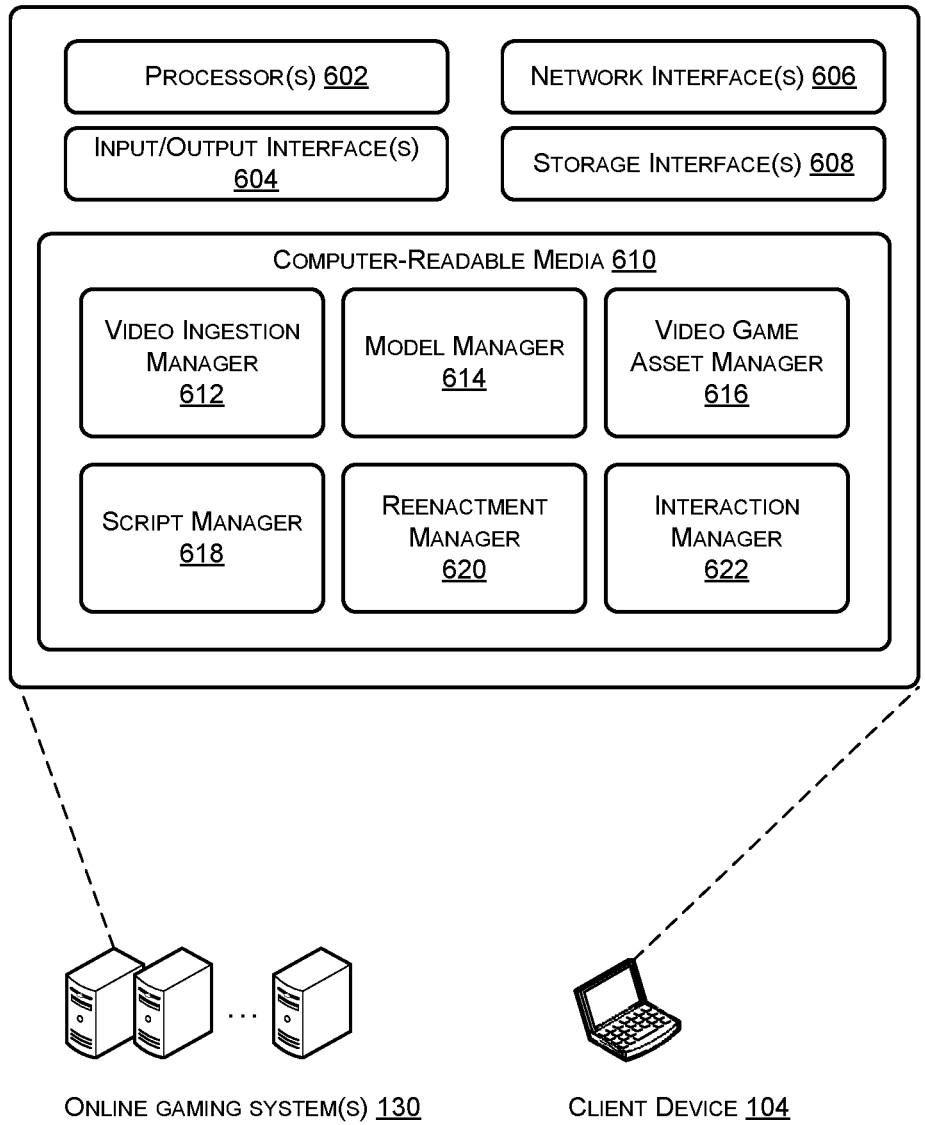
FIG. 6 illustrates a block diagram of example client system(s) and/or online gaming system(s) that may interactively reenact a video clip in a video game, in accordance with example embodiments of the disclosure.

FIG. 6 illustrates a block diagram of example client device(s) 104 and/or online gaming system(s) 110 that may interactively reenact a video clip in a video game, in accordance with example embodiments of the disclosure. The example client system(s) 104 and/or the online gaming system(s) 110 may include one or more processor(s) 602, one or more I/O interface(s) 604, one or more network interface(s) 606, one or more storage interface(s) 608, and computer-readable media 610. The description of the one or more processor(s) 602, the one or more I/O interface(s) 604, the one or more network interface(s) 606, the one or more storage interface(s) 608, and the computer-readable media 610 may be substantially similar to the descriptions of the one or more processor(s) 502, the one or more I/O interface(s) 504, the one or more network interface(s) 506, the one or more storage interface(s) 508, and the computer-readable media 510, respectively, and in the interest of brevity, is not be repeated here.

Several functional blocks having instruction, data stores, and so forth may be stored within the computer-readable media 610 and configured to execute on the processor(s) 602. The computer readable media 610 may have stored thereon a video ingestion manager 612, a model manager 614, a video game asset manager 616, a script manager 618, a reenactment manager 620, and an interaction manager 622. It will be appreciated that each of the functional blocks 612, 614, 616, 618, 620, 622, may have instructions stored thereon that when executed by the processor(s) 602 may enable various functions pertaining to the operations of the client device(s) 104 and/or online gaming system(s) 110.

The instructions stored in the video ingestion manager 612, when executed by the processor(s) 602, may configure the client device(s) 104 and/or online gaming system(s) 110 to accept video clips 112, such as from a player 102. These video clips 112 may be stored and managed and processed to generate a corresponding reenactment script 116 by the client device(s) 104 and/or online gaming system(s) 110.

The instructions stored in the model manager 614, when executed by the processor(s) 602, may configure the client device(s) 104 and/or online gaming system(s) 110 to store and manage various video translation models 114 associated any variety of video games. These video game models 114 may be invoked when a player 102 wishes to generate a reenactment from a video clip 112.

The instructions stored in the video game asset manager 616, when executed by the processor(s) 602, may configure the client device(s) 104 and/or online gaming system(s) 110 to access an inventory of assets (e.g., virtual actions and/or virtual objects) available within the video game. The client device(s) 104 and/or online gaming system(s) 110 may be configured to match objects and actions in the video clip 112 that is to be reenacted to virtual objects and virtual actions within the video game.

The instructions stored in the script manager 618, when executed by the processor(s) 602, may configure the client device(s) 104 and/or online gaming system(s) 110 to store and/or manage reenactment scripts 116. These reenactment scripts may have been generated from video clips 112 provided by the player 102 and may be invoked by the player 102 to reenact the video clip 112 to which the reenactment script 116 corresponds.

The instructions stored in the reenactment manager 620, when executed by the processor(s) 602, may configure the client device(s) 104 and/or online gaming system(s) 110 to invoke and play a reenactment script 116 when a player 102 chooses to do so. The client device(s) 104 and/or online gaming system(s) 110 may receive a user input, such as from the player 102, indicating that he or she is interested in playing a reenactment associated with a particular reenactment script 116, and based at least in part on that input, the client device(s) 104 and/or online gaming system(s) 110 may start playing the reenactment script 116 within the video game.

The instructions stored in the interaction manager 622, when executed by the processor(s) 602, may configure the client device(s) 104 and/or online gaming system(s) 110 to allow for player control within a reenactment. The client device(s) 104 and/or online gaming system(s) 110 may monitor for user input(s) that may indicate that he player 102 wishes to execute one or more actions within a reenactment. The actions performed by the player 102 may be substitutive, subtractive, and/or additive. The client device(s) 104 and/or online gaming system(s) 110 may be configured to keep track of the virtual actions within the reenactment that correspond to the actions performed by the player 102 and skip those virtual actions if control of the video game is returned to the reenactment.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
one or more processors; and
one or more computer-readable media storing computer-executable instructions that, when executed by the one or more processors, cause the one or more processors to:
receive a video clip depicting a first object, a second object, and a first action performed by the first object, the video clip to be reenacted within a video game;
identify a video translation model associated with the video game;
determine, based at least in part on the video translation model and the video clip, a first virtual object associated with the first object, a second virtual object associated with the second object, and a first virtual action associated with the first action performed by the first object; and
output a reenactment of the video clip by including, within game play of the video game, the first virtual object, the second virtual object, and the first virtual action, wherein the first virtual object performs the first virtual action.

2. The system of claim 1, wherein the computer-executable instructions further cause the one or more processors to:
generate a reenactment script including an indication of the first virtual object, the second virtual object, and the first action, wherein to perform a reenactment of the video clip is based at least in part on the reenactment script.

3. The system of claim 1, wherein the computer-executable instructions further cause the one or more processors to:
determine, based at least in part on the video translation model and the video clip, a second virtual action and a third virtual action.

4. The system of claim 3, wherein the computer-executable instructions further cause the one or more processors to:
receiving an indication that a player account associated with a player is to take control prior to the second virtual action;
receive an input from the player account corresponding to a fourth virtual action;
perform, based at least in part on the input, the fourth virtual action;
determine that the fourth virtual action is associated with the second virtual action;
determine that the player account wishes to continue with the reenactment after the fourth virtual action; and
perform the third virtual action.

5. The system of claim 1, wherein to determine the first virtual object associated with the first object, the second virtual object associated with the second object, and the virtual action associated with the first action performed by the first object, the computer-executable instructions further cause the one or more processors to:
segment the video clip to identify the first object in the video clip;
identify plurality of virtual objects available within the video game, the plurality of virtual objects including the first virtual object and the second virtual object; and
determine that the first object in the video clip corresponds most closely with the first virtual object compared to other objects of the plurality of virtual objects.

6. The system of claim 1, wherein the video translation model is a neural network model trained using labeled training video clips.

7. The system of claim 6, wherein the labeled training video clips comprise video game clips associated with the video game.

8. The system of claim 1, wherein the computer-executable instructions further cause the one or more processors to:
receive an indication that a player account associated with a player is to reenact a second video clip;
identify a reenactment script associated with the second video clip; and
reenact the second video clip using the reenactment script.

9. A method, comprising:
receiving a video clip depicting a first object, a second object, and a first action performed by the first object, the video clip to be reenacted within a video game;
determining, based at least in part on a video translation model and the video clip, a first virtual object associated with the first object, a second virtual object associated with the second object, and a first virtual action associated with the first action performed by the first object; and
generating a reenactment script indicating the first virtual object, the second virtual object, and the first action performed by the first object, wherein the reenactment script enables reenactment of the video clip within the video game.

10. The method of claim 9, wherein determining the first virtual object associated with the first object, the second virtual object associated with the second object, and the virtual action associated with the first action performed by the first object further comprises:
segmenting the video clip to identify the first object in the video clip;
identifying a plurality of virtual objects available within the video game, the plurality of virtual objects including the first virtual object and the second virtual object; and
determining that the second object in the video clip corresponds most closely with the second virtual object compared to other objects of the plurality of virtual objects.

11. The method of claim 9, further comprising:
providing game play of the video game to a player account associated with a player; and
performing, within the game play and based at least in part on the reenactment script, the first virtual object, the second virtual object, and the first virtual action, wherein the first virtual object performs the first virtual action.

12. The method of claim 11, further comprising:
determining, based at least in part on the video translation model and the video clip, a second virtual action and a third virtual action.

13. The method of claim 12, further comprising:
receiving an indication that the player account is to take control prior to the second virtual action;
receiving an input from the player account corresponding to a fourth virtual action;
performing, based at least in part on the input, the fourth virtual action;
determining that the fourth virtual action is associated with the second virtual action;
determining that the player account is to continue with the reenactment after the fourth virtual action; and
performing the third virtual action.

14. The method of claim 9, further comprising:
receiving an indication that a player account associated with a player is to reenact a second video clip;
identify a second reenactment script associated with the second video clip; and
reenact the second video clip using the second reenactment script.

15. The method of claim 9, wherein the video translation model is a neural network model trained using labeled training video clips.

16. The method of claim 15, wherein the labeled training video clips comprise video game clips associated with the video game.

17. A system, comprising:
one or more processors; and
one or more computer-readable media storing computer-executable instructions that, when executed by the one or more processors, cause the one or more processors to:
identify training data including one or more video game clips, wherein the video game clips are labeled;
train, based at least in part on the training data, a video translation model; and
deploy the video translation model, wherein the video translation model enables generating a reenactment script that maps objects and actions within a video clip to corresponding virtual objects and virtual actions in a video game.

18. The system of claim 17, wherein to train the video translation model further comprises unsupervised training using the video game clips.

19. The system of claim 17, wherein the training data further comprises unlabeled video clips.

20. The system of claim 17, wherein the video translation model comprises a convolution neural network model.

* * * * *